United States Patent

Worth et al.

[15] 3,661,397

[45] May 9, 1972

[54] ADDRESSING MECHANISM

[72] Inventors: Edward L. Worth, Lexington; Allan B. Chertok, Cambridge, both of Mass.

[73] Assignee: EG & G Inc., Bedford, Mass.

[22] Filed: July 25, 1969

[21] Appl. No.: 845,022

[52] U.S. Cl. ..........................274/9 RA, 179/100.4, 274/15, 274/23, 340/173, 340/174.1

[51] Int. Cl. .................G11b 3/00, G11b 25/04, G11b 25/06

[58] Field of Search .....................274/23, 13, 13.1, 14, 15, 9, 274/10; 340/173, 174.1; 179/100.4, 100

[56] References Cited

UNITED STATES PATENTS

| | | | |
|---|---|---|---|
| 3,169,774 | 2/1965 | Paellenbach | 274/14 |
| 3,356,373 | 12/1967 | Laux | 274/23 |
| 3,390,883 | 7/1968 | Van Antwerp | 274/10 |
| 3,503,615 | 3/1970 | Matsuda | 274/1 |

*Primary Examiner*—Leonard Forman
*Assistant Examiner*—Steven L. Stephan
*Attorney*—Kenway, Jenney & Hildreth and Ralph L. Cadwalader

[57] ABSTRACT

A device for retrieving selected informational material stored in a groove formed in a rotatable recording element. A stylus, which is disposed above the recording element, is mounted at a fixed, reference position to a transport mechanism which may be moved to position the stylus over that portion of the groove at which the particular information is stored. The device then lowers the stylus into the groove. When in the lowered position, the stylus is permitted limited freedom of movement so that it may track in the groove as the recording element is rotated. After the desired information has been retrieved the stylus is raised to the reference position.

9 Claims, 4 Drawing Figures

PATENTED MAY 9 1972 3,661,397

INVENTORS
EDWARD L. WORTH
BY ALLAN B. CHERTOK
Kenway, Jenney & Hildreth
Ralph L. Cadwallader
ATTORNEYS

ADDRESSING MECHANISM

FIELD OF THE INVENTION

Our invention relates to the storage and retrieval of information and particularly digit information stored at predetermined locations or addresses in a memory unit.

BACKGROUND OF THE INVENTION

A great variety of systems have been employed in the prior art for this purpose. For example, one of the more common memory or storage techniques has been to employ matrices of magnetic cores in which a particular address location may be interrogated by selecting leads on each of two coordinates which intersect at the core to be addressed. Another commonly employed technique is to provide a continuous magnetic surface, such as on a tape, with the information being stored on the tape by selective orientation of the magnetic particles at the surface of the tape. In general, these systems are bulky and relatively expensive. They are employed primarily when it is necessary to provide a high degree of stability and accuracy as well as fast access time when these factors are more important considerations than the size and cost of the apparatus. These systems, however, do not lend themselves readily to storing the same information in a number of identical memory devices, that is, if it is desired to store a particular information catalog in a large number of separate memory units.

In those instances where it is desired to provide a large number of memory units and in which the access time to the stored information need not be extremely rapid, the memory unit may consist of a disc or cylinder having a groove inscribed thereon, with the digital information being carried within the groove. The information stored in the groove may be retrieved by a sensor, such as a stylus, which tracks along the groove as the memory unit is rotated, in similar fashion to a phonographic recording. A memory unit of this type is particularly advantageous in that it may store a considerable amount of digital information and may provide an intermediate speed access time. Moreover, a large number of identical memory units of this type having identical information stored thereon may be mass produced at relatively low cost by conventional processes employed in the fabrication of common phonographic recordings.

Such a memory system is described in copending application Ser. No. 817,068, filed on Apr. 17, 1969 and assigned to the assignee of all of the right, title and interest to this application.

The system described in that application includes a memory unit, such as a phonographic disc, supported on a turntable. A sensor, such as a stylus for tracking within the groove to read out the stored information, is supported by a transport mechanism which is effective to position the sensor at the desired address so that the stylus need not track along the full length of the groove until the address is reached. As described in greater detail below, the transport mechanism is effective to move the stylus, above the disc, in a traversing direction which crosses the grooves of the memory disc to a position that is in substantial registry with a predetermined groove on the disc. The transport mechanism then lowers the stylus into engagement with the groove so that it may read out the information stored therein. The operation of the transport mechanism is controlled by appropriate electronic circuitry which receives an input, as from the pushbuttons of a keyboard. The input, for example, may comprise a digital number to be looked up on the phonographic disc. The address at which the number would be located is then determined by the circuit associated with the system which, in turn, controls and drives the transport mechanism to position the stylus at the desired address.

Thus, because the desired information may be stored on the memory disc in any address in the groove, it is desirable, in order to reduce the access time, to move the sensor or stylus directly to or close to that portion of the groove corresponding to the desired address. Because of the relatively small dimensions and compact spacing of the grooves, it should be appreciated that precise location and positioning of the stylus exactly at the desired groove or address would require a high degree of manufacturing tolerance both in the fabrication of the record and in the construction of the stylus transport mechanism itself. In order to avoid such high tolerance manufacturing and its attendant increased costs, the transport mechanism is constructed and operated to cause the stylus to engage the groove at a location that is known to be slightly in advance of the desired address at which the informational material is located, for example, four or five grooves in advance of the groove in which the address is located. Thus by delaying slightly the time at which the address is reached, great savings may be obtained in the manufacture of records as well as the readout equipment.

SUMMARY OF THE INVENTION

Broadly speaking, the present invention provides a transport mechanism which is constructed to position and maintain the stylus arm in precise registration with known addresses on the memory disc, yet which enables the stylus to freely travel along the groove for a relatively large number of turns to read out the stored information. The construction of this mechanism enables the stylus, when it is raised from the disc, to return to the same position it occupied with reference to a specific disc address prior to engagement with the groove, thus enabling subsequent accurate repositioning of the stylus to the next desired address.

DESCRIPTION OF PREFERRED EMBODIMENT

Figure 1:
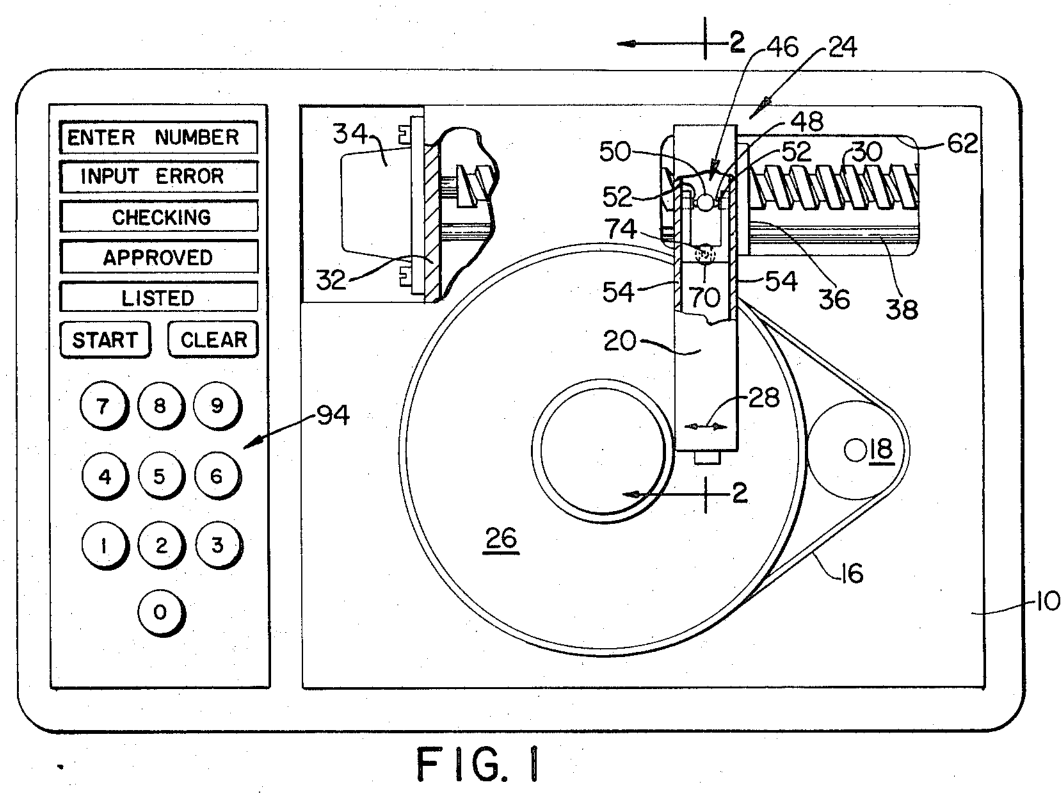
FIG. 1 is a plan view of the apparatus illustrating the keyboard and transport mechanism for the stylus.

As shown in FIG. 1, the device includes a base 10 on which a turntable 12 having a central post 14 is rotatably mounted. The turntable 12 is driven by a belt 16 which in turn is driven by a pulley 18 and motor (not shown) supported from the underside of the base 10. A recording arm 20 having a stylus 22 at one end, extends over the surface of the turntable and is supported, at its other end, by a transport mechanism indicated generally by the reference character 24. As described below in greater detail, the transport mechanism 24 is effective to maintain the arm 20 and stylus 22 in a rigid position that is above the level of the turntable 12 and when in this position, to impart primary positioning movement in a traversing direction to the arm 20 and stylus 22 to position the stylus 22 over a predetermined groove in the phonographic disc 26 when the disc is supported on the turntable. The transport mechanism 24 then lowers the arm 20 to cause the stylus to engage the desired groove. When lowered, the recording arm 20 is released from its rigid position and is permitted limited, secondary freedom of movement in a traversing direction to enable the stylus to track along the groove as the phonographic disc is rotated. As used herein, a "traversing" direction is intended to mean a direction which is roughly normal to the axis of the groove. Thus, when employed in connection with a disc-shaped memory unit having a spiral groove, a traversing direction would be generally radial of the disc, as indicated by the arrow 28 in FIG. 1. If the memory unit were in the form of a cylinder having a helical groove formed about its surface, the "traversing" direction would be substantially parallel to the axis of the cylinder. In the illustrative embodiment of the invention, traversing movement may be imparted to the stylus either by bodily movement of the transport mechanism 24 and arm 20 to position the stylus above a selected groove ro by pivotal movement of the arm 20 with respect to the transport mechanism 24 when the stylus 22 is lowered and is tracking within the groove.

Figures 2, 3:
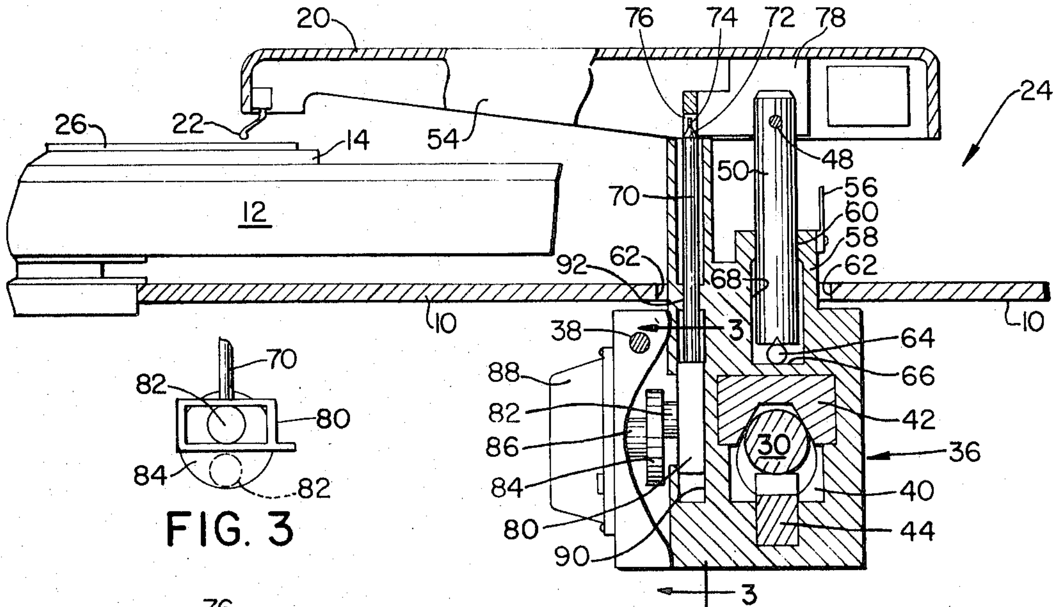
FIG. 2 is an illustration of the transport mechanism and turntable as viewed along the line 2—2 of FIG. 1.
FIG. 3 is an illustration of a device for raising and lowering the stylus as viewed along the line 3—3 of FIG. 2.

As shown more clearly in FIG. 2, the transport mechanism 24 includes a drive screw 30 which is rotatably supported beneath the base 10 between a pair of journal brackets 32. The axis of the drive screw 30 is disposed in a traversing direction and is driven by a precision incremental stepping motor 34 which may be secured to one of the journalled brackets 32. A housing 36 which supports the recording arm 20 surrounds and engages the drive screw 30 so that when the screw is rotated, the housing 36, together with its supported recording arm 20 will be driven in a traversing direction. The housing 36 is supported for sliding movement by a guide rod 38 which may be supported between the depending journal brackets 32 and is parallel to the drive screw 30. The drive screw 30 passes through an opening 40 formed in the housing 36 and a smooth guide block 42, which is secured to the housing bears against the top of the drive screw 30 to provide further support for the housing 36. The bottom of the drive screw 30 engages a drive tooth 44 that is secured to the housing 36 and extends upwardly into the opening 40 and into engagement with the drive screw 30 to impart the traversing movement to the housing and all elements supported on it.

The recording arm 20 is mounted at one end to the housing 36 for limited universal movement by means of a jewel bearing 46 comprising a transverse shaft 48 secured to the upper end of an upstanding shaft 50, the transverse ends of the shaft 48 engaging a pair of jewels 52 which threadably mount in side walls 79 of support member 78. The upward pivotal movement of the arm is limited by a stop plate 56 which is secured to the upper portion 58 of the housing. The upstanding shaft 50 is supported in a guide bearing 60 which is defined by a bore formed in the upper portion 58 of the housing, the upper portion 58 protruding upwardly through the slot 62 in the bore. The shaft 50 is supported against down ward movement and for rotation about a vertical axis by a thrust bearing comprising a ball bearing 64 resting at the base 66 of an enlarged bore 68 formed in the housing 36.

Figure 4:
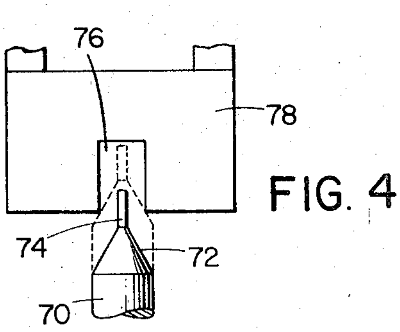
FIG. 4 is an enlarged view of the connection between the drive rod and the recording arm.

As shown in FIGS. 2 and 4, the pivotal movement of the recording arm 20, to move stylus 22 vertically toward and away from the supported phonographic disc 26 is effected by means of a drive rod 70, the upper end of which is of reduced dimensions including a conical portion 72 terminating in a small diameter pin 74. As shown more clearly in phantom in FIG. 4, the conical portion 72 is intended to fit within an opening 76 formed in support member 78 which is secured to the sides 54 of the arm 20. Opening 76 may be either a slot or a hole. The rod 70 is movable in a vertical direction to pivot the arm 20 about the shaft 48 and thus to raise or lower the stylus 22. The vertical movement of the rod 70 is effected by means of a scotch yoke 80 which is secured to the lower end of the drive rod 70 and which is driven by a crank pin 82 formed on a crank arm 84. The crank arm 84 is driven by the shaft 86 of a control motor 88 which is secured to the housing 36. The yoke 80 and the drive rod 70 are guided for vertical movement within a slot 90 and a bore 92 formed in the housing 36.

When in the raised position shown in FIG. 2, the conical surface 72 of the rod 70 is in full engagement with its slot 76 in the bracket 78 to preclude horizontal pivoting movement of the arm 20 and stylus 22 about the upstanding shaft 50.

The stylus 22 may be lowered into engagement with the phonographic disc 26 by operating the control motor 88 to rotate the crank pin 82 to the position shown in phantom in FIG. 3, this being the lowermost position of the yoke and pin. In the lowered position, the small diameter pin 74 fits loosely within the opening 76 (as shown in FIG. 4) and the arm 20 is free to traverse with the stylus 22 as it tracks along the groove on the record. This limited amount of traversing movement permitted the arm 20 and stylus 22, when in a groove-engaging position, is of sufficient magnitude to enable the stylus 22 to track freely for several turns of the groove ahead of and beyond the portion of the groove that should carry the desired address, before the pin 74 again engages the surface of the slot 76 in the bracket 78. In practice, the limited freedom of traversing motion between the pin 74 and bracket 78 is made sufficient so that the pin never engages the surface of the hole in normal operation.

The stylus needs the freedom to move beyond the initial engagement position since the tracking in the groove normally provides motion to the stylus in this direction. Freedom in the opposite direction is needed because only the groove may be slightly eccentric with respect to the axis of rotation such that the initial force on the stylus from the rotation of the groove may be in the outward direction. Without such freedom of movement the stylus might jump the track or damage the record.

After the stylus 22 has retrieved the information stored at the particular address, the arm 20 is raised. It should be appreciated that by operating the control motor 88 to raise the arm 20 and disengage the stylus 22, the arm and stylus will be returned to the same position with respect to the housing 36 when the conical end of the drive rod 70 becomes seated fully within its complementary slot 76 in the bracket 78. Thus, because the arm, and hence the stylus, is always returned to the same position with respect to the housing, it is insured that when the stepping motor 34 thereafter is operated to impart traversing movement to the housing and its supported arm and stylus, there will be no error or misalignment when the stylus is moved to a new position.

In operating the system a memory disc, such as a conventional 7 inch 45 RPM phonograph record having a spiral groove, may be employed. The groove may have any number of turns and, for purposes of illustrated, 256 such turns may be provided. Both the informational material and its address is stored, in predetermined order, in the groove in the form of undulations in binary form. Each address, therefore, corresponds to a portion of the spiral groove and may include one or more turns of the groove. The electronics associated with the stepping motor 34 causes the motor 34 to drive the housing 36 to a position along the drive screw 30 at which the stylus 22 is in a reference or home position. The home position may be preselected so that the stylus will be disposed above and in the general vicinity of turn 128 of the spiral groove which is approximately equidistant from the beginning and the end of the groove. The precise location of this home position with reference to the groove may be calibrated for the particular disc so that a known position of the housing 36 corresponds to the stylus 22 being located precisely above turn 128 of the groove in the disc. Because the stylus, when raised by the drive rod 70, will be returned to the same position with respect to the housing 36, it is insured that each time the housing is driven to the reference position along the drive screw 30, the stylus 22 will also be returned to the same position above the turntable 12.

With the housing 36 and stylus 22 in the home position, the operator enters the appropriate input signal, corresponding to the address of the information to be retrieved, by any appropriate means, such as by depressing the keyboard pushbuttons 94 in the proper sequence. The address on the disc is then determined by electronics associated with the system, which controls the stepping motor 34 to drive the housing 36 from its home position to a position above a turn of the groove, a few turns outside of that position of the groove where the proper address is located. For example, if the proper address is in turn 138 the stepping motor 34 advances the housing 36 until the stylus 22 is disposed immediately above turn 135. When the stylus is lowered, by operation of the control motor 88, it is therefore insured that the stylus will track or scan all of the information stored at the desired address and that none of this information will be omitted, as might be the case if the stylus 22 initially engaged the latter portion of turn 138 or another turn beyond turn 138. The address read from the groove when the stylus 22 first engages the groove is stored in the circuitry and used to compute the number of motor steps required to return the arm to the home position.

By causing the stylus 22 to engage the groove in advance of the proper address a portion of the information stored at the preceding address will be retrieved. The electronic circuitry associated with the system is designed to be inoperative or unresponsive to this unwanted information in advance of that stored at the desired address. An appropriate comparator circuit is provided and effective to preclude the operation of the other, informational, responsive circuitry until the stylus has tracked to the desired address in the groove. This address, which is stored in the form of undulations in the groove is transmitted through the stylus to the comparator circuit which then switches the other circuits to an operational mode. Additional circuitry is also provided to actuate the control motor 88 and raise the arm 20 and stylus 22 when the information has been retrieved. The precision stepping motor 34 then returns the housing 36 to the home position in readiness for a new cycle of operation.

Although our device has been described as being employed primarily with a memory unit in disc form, it may be employed with a cylindrical memory unit having a helical groove formed about its surface, the cylinder being mounted for rotation about an axis paralleling that of the drive screw 30. In this arrangement, it may be preferable to mount the recording arm 20 to the housing 36 for linear, traversing movement instead of the pivotal mounting described herein in connection with the disc memory unit in order to enable the stylus to track freely in the groove.

Having thus described our invention what we desire to claim and secure by Letters Patent is:

1. An apparatus for tracking selected turns of a groove formed on a rotatably supported phonographic recording element comprising:

means for rotatably supporting said recording element;

a stylus;

means for moving said stylus in a first direction toward and away from said grooved surface of said supported recording element between a first remote position and a second, groove engaging position;

means for imparting primary traversing movement to said stylus in a second direction while said stylus is in said first position, to enable said stylus to be positioned in spaced registry with a selected turn of said groove so that said stylus thereafter may be moved to said second position into engagement with said selected turn of said groove;

a movable stylus arm for mounting said stylus, said means for moving said stylus toward and away from said recording element comprising, a drive rod mounted for vertical movement and engageable with said stylus arm to effect vertical movement of said stylus arm, and drive means connected to said rod for effecting said movement; and wherein the upper end of said rod is of reduced diameter and wherein said stylus arm has an opening formed therein to receive the reduced end of said rod, said opening being substantially larger than the diameter of the reduced end of said rod and smaller than the unreduced diameter of the rod, said drive means imparting sufficient vertical motion to said arm so that in the upper position of said rod the rod is tightly engaged with the opening in said arm, inhibiting horizontal secondary motion of said arm, and in the lower position of said rod, the opening in said arm is loosely engaged with the reduced portion of said rod allowing limited horizontal secondary motion of said arm.

2. An apparatus as defined in claim 4 wherein the reduced end of said rod is of a tapered configuration, said apparatus further comprising: means limiting the extent of downward movement of said rod so that when said stylus has been lowered into engagement with said recording element, a portion of said tapered end of said rod will protrude into said opening and will be in spaced relation to the internal walls of said opening; said spacing between said opening and the tapered portion of said rod disposed therein comprising said means limiting the extent of secondary movement of said stylus.

3. An apparatus as defined in claim 1 wherein the engagement of said rod with said opening in said recording arm comprises said means precluding said secondary freedom of traversing movement of said stylus when said stylus is in said first position.

4. An apparatus for tracking selected grooves formed on a rotatably supported phonographic recording element comprising:

means for rotatably supporting said recording element;

an arm;

a stylus mounted to one end of said arm;

a housing;

means connecting the other end of said arm to said housing to enable said stylus on said one end to move in a vertical and a traversing direction with respect to said housing;

a vertically extending drive rod mounted to said housing for vertical movement, the upper end of said drive rod being reduced in diameter and being engageable with said arm at a location intermediate said stylus and the connection of said arm to said housing;

said arm having an opening formed therein which is receptive to said reduced diameter upper end of said rod, said opening being of smaller dimension than the unreduced lower portions of said rod so that said rod may be urged upwardly until a portion of said rod is in full, snug engagement with said opening whereby further vertical movement of said rod will urge said arm and stylus upwardly about said connection toward a first position in which said stylus is spaced vertically above said recording element, said snug engagement of said rod with said opening in this first position precluding traversing movement of said arm and said stylus with respect to said housing;

said rod being movable downwardly to a position in which said stylus is in a lowered, groove engaging position and in which said end of said rod is withdrawn downwardly from said snug engagement thereof with only the reduced portion of said rod remaining within the opening in said arm thereby enabling said arm and stylus to have traversing freedom of movement to enable said stylus to track freely within the groove of said recording element;

drive means for moving said rod in the vertical direction to effect said engagements; and means for moving said housing along a traversing direction while said stylus is in said first, remote position to enable said stylus to be positioned in registry with a selected turn in the groove of said recording element whereby subsequent downward movement of said rod will lower said stylus into engagement with said selected turn of said groove.

5. An apparatus as defined in claim 4 wherein said reduced end of said rod is of a tapered configuration, said apparatus further comprising:

means limiting the extent of downward movement of said rod so that when said stylus has been lowered into engagement with said recording element, a portion of said tapered end of said rod will protrude into said opening and will be disposed in spaced relation to the internal perimetric surface of said opening;

said spacing between said opening and the tapered portion of said rod disposed therein limiting the extent of secondary traversing movement of said stylus.

6. An apparatus as defined in claim 4 wherein said connection between said arm and said housing comprises:

an upstanding shaft journalled to said housing and extending upwardly therefrom for rotation about a vertical axis;

means connecting said arm to the upper end of said shaft at a pivotal connection to permit vertical movement of the stylus end of said arm.

7. An apparatus as defined in claim 4 wherein said means for moving said housing along said traversing direction comprises:

a worm shaft mounted for rotation about an axis disposed in a traversing direction;

means mounting said housing to said worm shaft for movement paralleling the axis of said shaft; and a tooth secured to said housing and in engagement with said worm shaft so that rotation of said shaft will move said housing in a traversing direction.

8. An apparatus as defined in claim 7 wherein said worm shaft is driven by a precision stepping motor to enable said housing to be driven to a precise position along said worm shaft thereby enabling said stylus to be positioned in registry with a selected turn of the groove in said supported recording element.

9. An apparatus as defined in claim 4 wherein said means for effecting said vertical movement of said rod comprises:

a scotch yoke secured to the lower end of said rod; and motor means secured to said housing and being engageable with said scotch yoke to drive said yoke between an upper and lower position, said upper and lower positions of said yoke corresponding to said upper and lower positions of said drive rod.

* * * * *